(12) United States Patent
Skoglund et al.

(10) Patent No.: US 6,418,243 B1
(45) Date of Patent: Jul. 9, 2002

(54) APPARATUS AND METHOD FOR PROVIDING HIGH FIDELITY RECONSTRUCTION OF AN OBSERVED SAMPLE

(76) Inventors: B. Ulf Skoglund, Snackvagen 34, S-141 31 Huddinge (SE); Gérard M. R. Bricogne, 43 Newton Road, Cambridge CB 2AL (GB)

( * ) Notice: Subject to any disclaimer, the term of this patent is extended or adjusted under 35 U.S.C. 154(b) by 0 days.

(21) Appl. No.: 09/142,511
(22) PCT Filed: Mar. 7, 1997
(86) PCT No.: PCT/SE97/00398
   § 371 (c)(1),
   (2), (4) Date: Nov. 10, 1998
(87) PCT Pub. No.: WO97/33255
   PCT Pub. Date: Sep. 12, 1997

(30) Foreign Application Priority Data

Mar. 7, 1996 (SE) .............................................. 9600896
Mar. 29, 1996 (SE) .............................................. 9601229

(51) Int. Cl.[7] .............................................................. G06K 9/40
(52) U.S. Cl. ........................ 382/274; 382/128; 382/154; 345/419
(58) Field of Search ................................. 382/128, 131, 382/132, 154, 274; 345/419, 420, 427

(56) References Cited

U.S. PATENT DOCUMENTS 4,630,203 A * 12/1986 Szirtes ........................ 382/132
4,661,986 A    4/1987 Adelson
5,079,703 A * 1/1992 Mosher et al. ................. 702/16
5,241,471 A    8/1993 Trousset et al.
5,420,788 A * 5/1995 Vissers ........................ 378/10
5,582,173 A * 12/1996 Li ............................... 600/443
5,821,943 A * 10/1998 Shashua ..................... 345/427

FOREIGN PATENT DOCUMENTS

EP          0 633 527         1/1995

* cited by examiner

Primary Examiner—Thomas D. Lee
(74) Attorney, Agent, or Firm—Young & Thompson (57) ABSTRACT

The invention relates to a method and an apparatus for providing high fidelity reconstruction built on a grid of an observed sample. An input means (10, 11, 13, 14; 40, 43, 14; 52, 13, 14) provides observed data of the sample. An estimated distribution means (19; 44; 54) provides an initial estimated distribution of the sample. A prejudice distribution means (21, 25, 15; 45, 15; 54, 15) provides a blurred prior prejudice distribution using estimated data. A calculating means (12) calculates in an iterative process for each iteration: a new estimated distribution of the sample using comparison between the estimated distribution in the next preceding iteration and said observed data of the sample from said in-put means; a new prior prejudice distribution on the new estimate less blurred than the prior prejudice distribution in the next preceding iteration. The calculation means (12) continues the iterations until the difference between the new estimated distribution and the next preceding estimated distribution is less than a predetermined condition. The calculated result is presented.

22 Claims, 6 Drawing Sheets

APPARATUS AND METHOD FOR PROVIDING HIGH FIDELITY RECONSTRUCTION OF AN OBSERVED SAMPLE

This invention relates to an apparatus and a method for high fidelity reconstruction of an observed sample and for visual reconstruction of the data.

DEFINITIONS AND ABBREVIATIONS

EM—electron microscopy

ET—electron tomography

CL—common lines method $F(\overline{X})$—density values at points (x,y,z) in a 3D reconstruction $m(\overline{X})$—a prior prejudice distribution C—A chi-squared statistic—a sum of squared differences between a projected 3D reconstruction and an observed projection divided by a measured variance of the observations.

$W(\overline{X})$—an interpolation used for convolution operation given by the fact that a 3D density is built on a 3D grid, said grid values defining a continuous function through a trilinear interpolation and decreasing the resolution somewhat because of decreased bandwidth.

$P^{(i)}$—a projection operation to the ith view a pupil function based on the deflection of electrons by the iris diaphragm.

CTF—a contrast transfer function

PSF—a point spread function by which each projected image must be subjected to convolution. PSF in Fourier space is the pupil function * CTF.

$T^{(i)}(\overline{X},\overline{x}^{(i)})$—a smearing function, based on the projected PSF $O^{(i)}(\overline{X},\overline{Y},\overline{x}^{(i)})$—an overlap function

*—multiplication

⊗—convolution

INTRODUCTION

In all data acquisition and signal processing systems resolution is a key factor. The degree of resolution is a direct measure of the size of the smallest detail that can be reproduced. The higher the resolution the better the recording. Resolution, however, is not all. A data acquisition system reacts, not only to the wanted quantity, but also to random processes such as noise and other interferences. When these interferences are of significant magnitude as compared with the resolution of the system, care must be taken in order to ensure that only meaningful information is extracted from the recorded data.

BACKGROUND OF THE INVENTION

Increased resolution and filtering are common practice in data acquisition and processing. The basics of this can be found in any university textbook on the subject, and numerous inventions have been made in this field.

The present invention relates to data acquisition and processing systems of such dimensions that the sheer amount of data poses serious technical problems in implementing conventional techniques. A particular field where these problems occur is the field of three-dimensional (3D) imaging of small objects at high resolution. In this case, the mere size of the calculations needed presents substantial technical problems. This calls for the use of more refined methods. Once established, such methods could have a broad range of applications. Thus, the teaching from them could also be transferred to other dimensions, for instance 2D and 1D applications. Also, 3D imaging of large sized objects at high resolution is an interesting application.

The fundamentals of for instance 3D reconstruction were investigated in the beginning of this century mathematically by Johan Radon. The idea of 3D imaging of small objects (molecules) was shown and conceived by Aaron Klug and coworkers, but was not implemented for single particles.

Several techniques have since been developed for reconstructing 3D images of different types of objects. 3D imaging of macromolecular complexes lacking symmetry still has technical problems to be solved. In this case, computer power is not enough. The equations to be solved are of such proportions that earlier attempts to solve the technical problem of computing the 3D image reconstruction, from a series of recorded 2D projections from an electron microscope, so that it can be visually displayed as a 3D image, have had limited success due to the limited accuracy and high noise levels.

The technical problems concerned with the reconstruction of 3D images of small objects at high resolution from a number of 2D projections and with a high signal to noise ratio, have not yet been solved in prior art.

One technical problem to overcome is that of the contrast transfer function (CTF) of the electron microscope, or any other input means that is used. CTF is dependent on microscope and focus and most of the parameters are linked to the machine to be used. This makes it difficult to achieve a quantitatively correct reconstruction of the measured quantity.

The noise levels in 3D imaging have been too high for single particle molecular imaging. Using a larger set of tilts increases the risk of radiation damage to the specimen. Averaging has limited effect on artefacts in recorded data. These effects are reduced by averaging but are still present.

Gradient methods have been implemented and used more recently in electron microscopy (EM) 3D reconstructions. However, in EM applications, as well as in some medical radiation therapeutical applications, the use of gradient refinement methods for image restoration seldom results in a substantial improvement in the quality or resolution of the refined 3D reconstruction due to the fact that a large portion of data is missing, as the reconstruction is made from a limited tilt series.

Another technique of 3D reconstruction is to project onto convex sets, which utilises an envelope that engulfs the 3D reconstructed object. Density modulations outside the envelope are regarded as artefactual and are reset to a constant value during the iteration cycles. The iterative refinement cycles proceed until the density modulations become small. The degree of improvement in a 3D reconstruction provided with this method has not been unambiguously established by comparison with an objective model.

In the field of a 3D image reconstruction the resolution which it is desirable to obtain could require such a large number of recorded data sets that calculations could be difficult to accomplish and this thus sets a practical limit for the resolution. The use of symmetry of a crystalline specimen or internal symmetry of a specimen reduces the size of the calculations needed to a technically manageable level. However, not all of the objects in question have internal symmetry, crystalline symmetry, or symmetric arrangement, and it would therefore be advantageous to have a method of data acquisition and processing including 3D reconstruction, which is not dependent on symmetry. Prior art solutions have not yet overcome the noise problem from intermediate (below 15 Å) to high (below 7 Å) resolutions without the need for symmetry to manage the calculations.

DESCRIPTION OF RELATED ART

A method of multi-scale reconstruction of the image of the structure of a body at an increased speed using iterative algorithms is disclosed in the U.S. Pat. No. 5,241,471. The algorithms are constructed such that the image of the object to be reconstructed is done on a structure, for instance a grid, having a finer and finer finesse from iteration to iteration. In this way the calculations could be done very fast. Thus, it will not work with fine details from the start and do not count on components having a resolution higher that the resolution of the structure (grid) actually in the iteration. No density distribution for individual grid points is done. The description of the sample on the grid is thus not changed from iteration to iteration, only its resolution.

An approach for providing a solution of this problem is to use maximum entropy. This is described by G. J. Ericksom & C. R. Smith, Maximum-Entropy and Bayesian methods in science and engineering, Volume 1:Foundations 1–314 (Kluwer Academic Publishers, Dordrecht, The Netherlands (1988)), by C. R. Smith & W. T. Grandy Jr, Maximum-Entropy and Bayesian methods in inverse problems, p 1–492 (D. Reidel Publishing Company, Dordrecht, Netherlands (1985)), and by B. Buck & V. A. Macaulay, 220 (Oxford University Press, New York (1991)). A maximum entropy 3D reconstruction has the property of being maximally noncommittal with regard to missing information (E. T. Jaynes, Physical Review 106, p 620–630 (1957)), and thus the maximum entropy method could serve as a powerful method to remove some of the detrimental effects caused by missing projections in ET reconstructions.

A method to perform a 3D reconstruction of an object with high resolution is described by Ali Mohammad-Djafari et al, "Maximum Entropy Image Reconstructions in X-Ray and Diffraction Tomography", IEEE Transactions on Medical Imaging Vol. 7 (December 1988) No 4,New York USA, PG. 345–354.

The argument and the applications in this referens refer only to a reconstruction from 1D to 2D, because of the idea that in medical imaging one reconstructs each circular "slice" independently from the others. Thus only 2D slice reconstructions are performed and the 3D is provided by adding the slices together. Thus the slices are treated as independent from each other. This method of treating the slices as independent gives unpredictable result when deconvoluting the real 3D point-spread function and possible line broadening. The result provided with the method described in this article can therefore not be quantitatively correct. When using the Poisson statistical properties of the image this is then not correct since it emanates from the a large part of the specimen, since the treatment of it is as if it were a local phenomenon restricted to a 1D line.

The implementations of the maximum entropy principles in ET 3D reconstructions have aimed at maximising the entropy while under the constraint that the reduced chi-squared statistic be equal to 1.0 as suggested by M. Barth, R. K. Bryan, R. Hegerl & W. Baumeister, Scanning Microsc. Suppl. 2, p 277–284 (1988) and by M. C. Lawrence, M. A. Jaffer & B. T. Sewell, Ultramicroscopy 31, p 285–301 (1989).

The usefulness of assigning low weight to improbable situations,so that the iterative solution of the problem becomes that of maximising the entropy relative to the non-informative prejudice, i.e. an estimated 3D prejudice distribution of the density, under the constraints of making the reduced chi-squared statistic equal to +1, has been shown by Gerard Bricogne in the article 'Maximum entropy and the foundations of direct methods' in Acta Crystallographica A40, pp410–445 (1984), which discloses an algorithm used for constrained entropy maximisation for crystallographic phase refinement against reciprocal space data. However, the mathematics shown by G. Bricogne can not be applied on the tomographic problem. His method is a development of so called direct methods within crystallography which give a generalized solution of a statistical problem and does not deal with imaging problems. A diffraction pattern is provided which is the diffraction data from crystallographic examinations giving focal planes, and thus no image is provided. When several generated focal planes are collected, for instance on a photographic film or detector, then the phase information of the different arriving waves is lacking. The crystallographic problem is aimed at finding the phase information so that an image can then be calculated.

Thus the problem in crystallography is different to that of 3D imaging of macromolecular complexes lacking symmetry, which is solved by the invention. However, the tools that have been developed to be used for providing a high fidelity reconstruction in real space could be the knowledge that it is important to have a constrained maximum entropy formalism and to use Taylor expansion of the chi-squared statistic and the entropy as quadratic models.

This kind of direct method described by Gerard Bricogne is directed to solve the phase problem in crystallography and is therefore not applicable in 3D imaging of macromolecules lacldng symmetry. Therefore, the whole concept had to be totally redesigned in order to perform for the real space imaging problem. The algorithm used for constrained entropy maximisation was thus first devised for crystallographic phase refinement against reciprocal space data. It was adapted to the tomographic situation by replacing the Fourier transformation which relates molecular model to diffraction data in the crystallographic setting by line projections in real space. However, it could not handle projections at any angle. The problem was to provide a method which was independent of specific data sampling strategies like single-axis tilt series, conical tilt series, random tilt series, or tilts from symmetric samples where the projection angles could be calculated later (as is the case for the adenovirus). This technical problem has now been solved according to the invention.

OBJECTS OF THE INVENTION

Is is an object of the invention to provide high fidelity reconstruction of an observed sample, for instance by 3D imaging, practically independent of the size of the object.

It is an object of the invention to overcome the technical problems mentioned above, concerned with 3D imaging of single particle macromolecular complexes at high resolution, with a high signal to noise ratio.

It is a further object of the invention to provide a method and an apparatus which is independent of the object's symmetry and which also offers the possibility of removing detrimental effects during the reconstruction of missing data.

It is also an object of the present invention to provide a 3D image reconstruction of single particle macromolecular objects lacking symmetry, with a high enough resolution to make it possible to reconstruct a 3D image of macromolecular objects lacking symmetry, using a series of 2D projections recorded with an electron microscope or a similar means.

It is a further object of the present invention, to solve the technical problem of the high noise levels present in 3D imaging, thus providing a low noise 3D imaging.

Another object of the invention, is to overcome the technical problem of the contrast transfer function of the electron microscope, or any other input means that is used, which makes it difficult to achieve a quantitatively correct reconstruction of the measured quantity.

A further object of the present invention. is to minimise the detrimental effects of non-recorded data on the reconstructed image.

Still a further object of the present invention, is to overcome the technical problem of imaging objects lacking symmetry.

Another object of the invention, is to overcome the technical problem of defining the physical parameters needed for accurate and optimal reconstruction.

Still another object of the invention is to provide an apparatus and a method which record, compute and present a true, i.e. a quantitatively correct, reconstruction of an observed sample with very high resolution.

Another object of the invention is to provide a reconstruction easy to use for the reconstruction of samples in different dimensions, for instance 3D, 2D and 1D appplications.

SUMMARY OF THE INVENTION

According to the invention a method and an apparatus is provided for generating a high fidelity reconstruction built on a grid of an observed sample, comprising: providing an initial estimated distribution of the sample built on the grid; providing a blurred prior prejudice distribution using estimated data; calculating in an iterative process for each iteration:

a new estimated distribution of the sample using comparison between the estimated distribution in the next preceding iteration and observed data of the sample, a new prior prejudice distribution on the new estimate less blurred than the prior prejudice distribution in the next preceding iteration;

continuing the iterations until the difference between the new estimated distribution and the next preceding estimated distribution is less than a predetermined condition.

The blurring is preferably provided by making a Fourier transform of the estimated structure and by multiplying the coefficients of this Fourier transform with the Fourier coefficients of a gaussian and spherical filter. The blurred structure is normalised before it is used as the new prior prejudice distribution in the next iteration cycle. According to a prefered aspect of the invention the following method steps are done:

a) providing several recorded observed data of the sample, each from a different aspect of the sample;

b) providing a variance for individual observation grid points in each recorded observed data;

c) calculating the reconstruction of the observed sample structure in the iterative process taking said initial estimated distribution as a first iteration reconstruction approximation;

d) for each iteration: calculating said new prior prejudice distribution using the next preceding reconstruction result, calculating a reduced chi-squared statistic (C) using the immediately preceding calculated reconstruction, the recorded observations and said variance, and the grid, while maintaining normalization of the calculated reconstruction, calculating an entropy (S) using the immediately preceding calculated reconstruction and the new prior prejudice distribution;

e) maximising the entropy under the constraint of driving the reduced chi-squared statistic towards +1, and providing a new calculated reconstruction to use in the next iteration cycle; and f) presenting the reconstruction.

Particularly, an apparatus and a method have been developed by which it is possible to record, compute and present a quantitatively correct 3D image of a macromolecular complex at high resolution on a visual display. However, the method as such is independent of size of the object and thus a correct 3D image of large sized objects could be done as well, for instance from tomographic recordings.

The invention is a development of, and thus based on, a maximum entropy method adapted to tomographic principles. According to the invention the Fourier transformation (which relates model to data in the crystallographic setting) is replaced by line projections in real space.

Thus, the maximum entropy distribution has, among other things, the property that no possibility is ignored, and that all possible situations are given a positive weight. A more powerful formulation than were proposed in the prior art is then to specifically make use of prior information in the algorithm and assign low weights to improbable situations, so that the iterative solution of the problem is that of maximising the entropy relative to the non-informative prior prejudice, i.e. an estimated 3D probability distribution of the density under the constraint that the reduced chi-squared statistic goes towards +1.

The maximum entropy 3D reconstruction has the property of being maximally noncommittal with regard to missing information, and could thus serve as a powerful method to remove some of the detrimental effects caused by the missing projections in ET (electron tomography) reconstructions. The implementations of the maximum entropy principles in ET 3D reconstructions have aimed at maximising the entropy under the constraint that reduced chi-squared statistic is aimed towards but does not go below +1. The reduced chi-squared statistic is the sum of the squared differences between the projected 3D reconstruction and the observed projections, each divided by the measured variances of the observations, and divided by the number of gridpoints of the projection in question. The variance of the observation data is the stated knowledge of them, and therefore the reduced chi-squared statistic is not allowed decrease below +1, because then that would mean that there are differences which are more relevant than the variance of the data. The maximum entropy distribution also has the property that no possibility is ignored and that all possible situations are given a positive weight.

ADVANTAGES OF THE INVENTION

The inventive method is preferably performed by having the same resolution and using the same grid for each projection. The reason for having low resolution of the density distribution on the grid points at the beginning and a high resolution later on is that it describes the probable density distribution of the objects in space. Thus, it does not describe that the object itself is blurred, but that the probable density distribution on the grid of it is blurred. After the first iteration a better adaptation has been done and because the entropy, for instance, has been higher the influence of the background has been lower. Therefore, a more narrow density distribution could be assumed in the next iteration cycle. Thus, no finer finess regarding the grid is done as in the U.S. Pat. No. 5,241,471 mentioned above. In the invention instead, the blurring is changed from a starting density distribution to give a better and better density resolution at the grid points from iteration to iteration.

With an apparatus and a method according to the invention, it is possible to solve the technical problem of high resolution 3D imaging of macromolecular objects lacking symmetry by using a reconstruction procedure that exploits the prior information, thereby providing a model-free refinement, and producing a 3D structure whose projection convoluted with the point spread function of the microscope will adapt to the observed structure to give a low noise 3D reconstruction that is quantitatively correct.

Thus, the results provided by the invention gives more reliable results than refinements based on overparametrised models. For instance, in the case of using diffraction, if the physics for the model refinement in not correct, then it is very difficult to come to an adequate result. This difficulty is avoided according to the invention.

The key to solving these technical problems lies within the practical solving of mathematical equations. All prior attempts to reconstruct and visually display a true 3D image of single macromolecular complexes lacking symmetry have failed, due to the fact that equations technically solvable in practice have not been available.

The awesome size of the calculations needed is reduced considerably by the use of an approximation that the value of the smearing function is $\neq 0$ only for a limited number of grid points, and by continuous improvement of the prejudice distribution, which reduces the amount of iteration cycles needed. Also a reduced calculation expression is given which speeds up the calculation such that it can be evaluated in about 1 minute, instead of about 300 years of evaluation time without the reduced expression. Also, a higher calculation precision is provided when using the reduced calculation expression. A further detailed description and discussion about this feature is given below in the description of the preferred embodiment.

An additional advantage of the invention is that it ends up close to the high theoretical resolution level given by Shannon's law. This means that the method according to the invention could be applied to any conventional data acquisition and processing system, for instance an over-sampled such, where it would provide both a higher resolution, due to the noise eliminating qualities of the method, than is possible using prior art methods.

What has been further perceived according to the invention is that a multiplying by the coefficients of the Fourier transform of the PSF function and the projected 3D density must be done instead of a division of the Fourier coefficients of the observed image with the Fourier coefficients of the PSF function because it is by using such a division many of the errors in the previous attempts to achieve a true reconstruction have been introduced. Thus the invention creates a 3D-structure whose projections after blurring with the PSF function will be the same as the observed projections. Thus, when the iterations are ended then a 3D-structure is provided in which practically no errors have been introduced.

BRIEF DESCRIPTION OF THE DRAWINGS

For a more complete understanding of the present invention and for further objects and advantages thereof, reference is now made to the following description taken in conjunction with the accompanying drawings, given as an example only, and in which.

DETAILED DESCRIPTION

Description of a Preferred Embodiment

Figure 1:
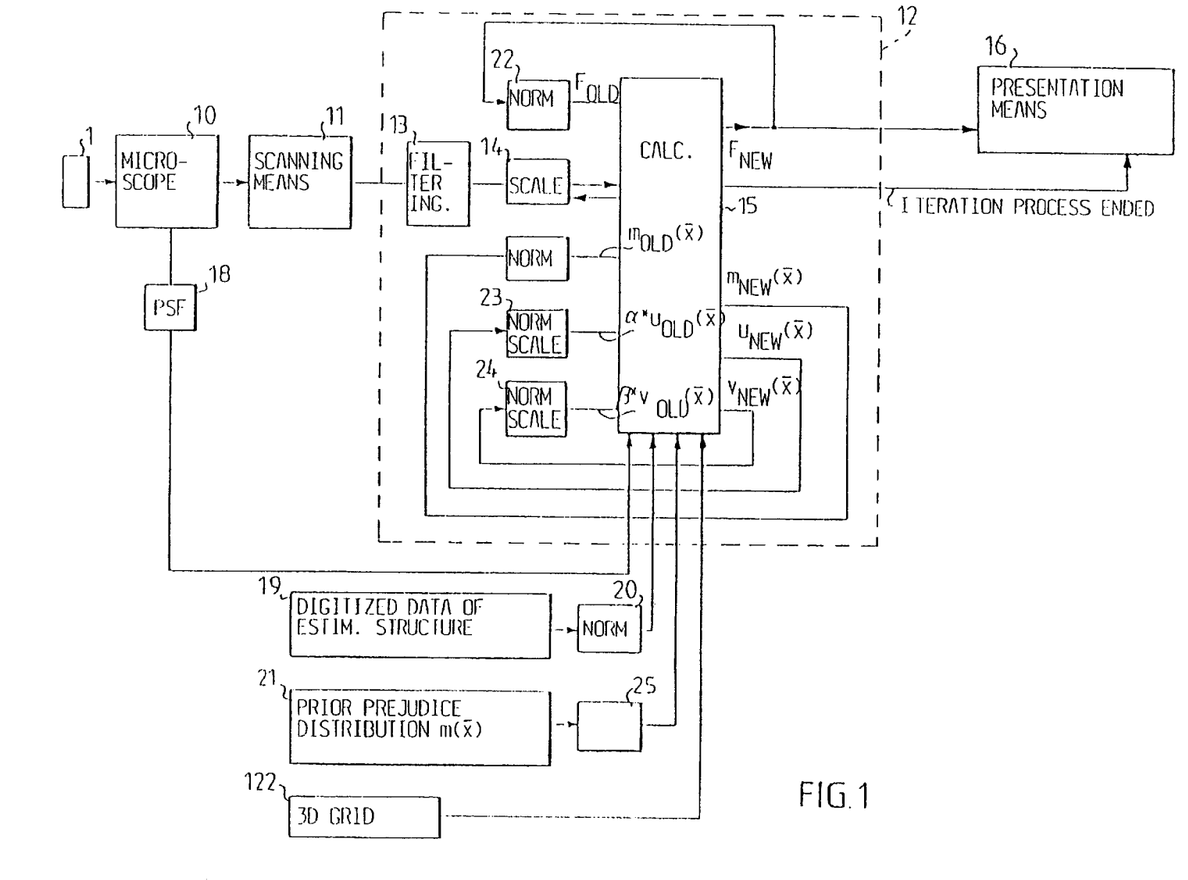
FIG. 1 shows a functional block diagram of a preferred embodiment of an apparatus according to the invention.

FIG. 1 shows a preferred embodiment of an apparatus for data acquisition and processing according to the invention, used in order to achieve a 3D image reconstruction at high resolution, of an object with no internal symmetry. It is independent of specific data sampling strategies and compensates for the different contrast transfer effects on the different views of a tilt series of projections thus handling projections at any angle, focusing on different depths or the like.

The apparatus comprises a specimen preparation means 1. The specimen is prepared, according to conventional methods, for viewing in a microscope 10, preferably an electron microscope but it could also be a light microscope or confocal microscope.

The microscope 10 provides several 2D projections in digitized form of the specimen, preferably by scanning it in a scanning means 11 connected to or included in the microscope 10. When the microscope is an electron microscope the recordings could be made under different tilt angles of the object with respect to the electron beam.

The method according to the invention could also be used in light microscopes. Then it is also possible to record projections focused at different depths in the specimen.

The method could also be used when recording a plurality of identical particles by considering each recorded particle as a different projection of one sample particle.

The digitized 2D projection data, i.e. density values, are supplied to a computer, wherein said data is first filtered in a filtering operation 13 to remove spurious inadequate signal jitter. Each 2D projection is an image and is also processed regarding geometry description for making the projections in the right directions, controlling image parameters etc in order to bring all the projections in harmony with each other. To compare projections to the observed micrographs, the densities in each projected image must also be scaled to a proper level for the i:th tilt by $b^{(i)}$ $$F_{compare}^{(i)}(\bar{x}^{(i)}) = b^{(i)} * F_{calc}^{(i)}(\bar{x}^{(i)}) \tag{1}$$

Thereafter, the processed data emanating from the microscope is scaled in a scaling operation 14 before it is transferred to a calculation operation 15 as observed micrographs.

In the computer 12, the maximum entropy refined 3D reconstruction is calculated iteratively from said data, maintaining normalization and driving the reduced chi-squared statistic to −1 under the constraint of prior prejudice, also called prior knowledge, as will be further explained below. The refined 3D reconstruction is fed to a presentation means 16, preferably a visual display, where it is presented as a 3D image.

Several help functions must be introduced into the computer 12 in order to enable it to make the iterative calculation to provide the high fidelity reconstruction.

A point spread function, PSF 18, is a characteristic function of the apparatus, such as a product of a pupil function and an analytical CTF (Contrast Transfer Function) of the devices 10 and 11. These parameters comprise defocus, acceleration voltage and spherical aberration etc. The CTF could be supplied as an experimental curve or as parameters refined from a parametrized model instead, and is one of the required inputs for the calculations. PSF can be computed by the computer 12 from measured apparatus parameters or an already computed PSF regarding the equipment actually used can be fed directly to the computer. Thus the block 18 comprises either measured apparatus parameters to be processed by the computer 12 or directly generated or already stored PSF.

When focus variations have to be considered for thicker specimens, the 3D density can be split up in layers of necessary thickness with each layer convoluted in the manner mentioned above with its proper PSF. Finally the layers are simply summed together.

Thus, when there is a variation across an image, then PSF is varying even within the image. In the case that there is a variation in the depth direction then the PSF is varying along the depth. If both said variations exist the the PSF is varying in both directions. The variation of the PSF causes no problems.

A 3D grid 122 is also fed into the computer. The reconstruction, the estimation and the prior prejudice functions are then built on this grid.

Another input 19 to the computer 12 is the digitized data of an estimated reconstruction, e.g. a 3D reconstruction made with conventional methods, which is used as the starting value for the iterations. This input is written into and stored in the computer 12 prior to the input from the scanning device 11. The estimated structure is normalized in a normalization means 20 either before it is inserted in the computer or by the computer program.

The computer makes use of a prejudice function $m(\overline{X})$ being normalized, i.e. $\int m(\overline{X})d^3X=1$, where $d^3$ means that the computation is done in 3D (in a 2D reconstruction application $d^2$ will be adequately used). The normalized prejudice function can be inserted externally from an inserting device 21 or could be computed by the computer 12, which for instance could make use of the estimated reconstruction to provide the initial prejudice function to start with. The computer 12 computes the high fidelity reconstruction using several iteration cycles. The prejudice function is also recomputed in each iteration cycle.

The initial prejudice distribution function provides a vague prejudice distribution of the reconstruction of the specimen 1. It is to be noted that a high probability of density value somewhere in the reconstructed sample indicates that it is a high probability that something really could be found there. A low probability of density value in the reconstructed sample thus indicates that it is a low probability that something really could be found there. Thus, the prejudice distribution function is used to provide a reasonable result from shifts computed of reduced chi-squared statistic for each iteration. The reduced chi-squared statistic should asymptotically reach +1, and the entropy maximise d for each iteration. Both are functions dependent on $m(\overline{X})$ and of the next preceding iteration reconstruction result.

The original prejudice function could be rather vague and freely chosen. However, the proability distribution function $m(\overline{X})$ is to be recalculated (and normalized) for each iteration in order to sharpen it. This could for instance be done by using the updated density distribution in every iteration, the normalization and blurring of it becoming the new prejudice distribution function for the density in the new reconstruction.

Principally, a blurring could be done by making a Fourier transform of the estimated structure and by multiplying the coefficients of this Fourier transform with the Fourier coefficients of a gaussian and spherical filter. The reason to make these transformations instead of working in the real space is that the coefficients of the filter will be so small that subpixel problems arise. The problem is more severe the lesser the blur is, which means that this problem gets more severe as the iterations proceed.

The blurred function so received has a decreased resolution and is, after normalization, the new prejudice distribution function for the new iteration.

The blurring could be rather strong at the first blurring operation, for a resolution of for instance 100 Å even if the observed data has an expected resolution of for instance 50 Å. Then the blurring is decreased for each iteration. There is principally no lower limit other than that the blur must be higher than zero.

The prejudice function has the purpose of providing a faster convergence to the final reconstruction. A problem if only the reduced chi-squared statistic is used is that noise will have a great influence, and this causes such an iteration process to stand still after a while and thus not be completed. The correction according the invention using the prejudice distribution allows the iterations to proceed.

Thus, in each iteration cycle a next, refined structure will be calculated, and a next, refined prejudice distribution will be generated. The next cycle prejudice distribution, is the refined structure of the current cycle, blurred with a gaussian and spherical filter and normalized. The next cycle prejudice distribution could also be generated in other ways, but the further the iterations proceed, the more accurate the prejudice distribution must be. This continuous improvement of the prejudice distribution results in a much quicker convergence of the iterations than would be the case with only the conditions on the reduced chi-squared statistic, which is too susceptible to noise. The size of the calculations is hereby decreased, and the resolution is improved.

According to the invention, a constrained maximum entropy tomographic reconstruction is computed in real space, which exploits the stored data of the estimated reconstruction and producing a 3D structure whose projection convoluted with the point spread function of the microscope will adapt to the observed structure, to give a low-noise 3D reconstruction that is quantitatively correct. The output of the computer is fed to the presentation device 16 presenting the reconstructed data as a 3D image on a visual display.

Given that $F(\overline{X})$ represents the density values at points (x,y,z) in the 3D reconstruction, and that $m(\overline{X})$ is the initial prejudice distribution, normalized such that $\int m(\overline{X})d^3X=1$, then the constrained maximum entropy principle implies that $F(\overline{X})$ must be determined a) to maximise the entropy $$S(F)=-\int F(\overline{X})ln(F(\overline{X})/m(\overline{X}))d^3X \qquad (2)$$

b) to maintain the normalization of $F(\overline{X})$ so that $\int F(\overline{X})d^3X=1$ c) and to aim the reduced chi-squared statistic towards +1 under the constraint of prior knowledge or prior prejudice distribution $m(\overline{X})$ being the result of the next preceding calculated distribution blurred with a gaussian and spherical filtering operation. The constraint on the reduced chi-squared statistic ensures that the reconstructed density is consistent—but not over-consistent—with its observed projections. Entropy maximisation ensures that the density modulations are as conservative as possible, giving the smoothest achievable density by eliminating details which are not significantly above noise and so flattening any artefacts that arise from systematic errors.

Thus, a harmonisation with data must be improved and therefore the reduced chi-squared statistic must be driven towards +1 at the same time, because the reduced chi-squared statistic is a measure of how the measured and calculated data differ from each other. The result is that each iteration gives a reconstruction which is as blurred as possible but which represents the recorded data about the specimen in a more confident way than what has been provided before with conventional reconstruction methods.

However, the blur of the reconstruction decreases for each iteration cycle so that the final result a) will explain the data in an optimal way but b) will contain as little information as possible in order to prevent overinterpretations.

The 3D density distribution is built on the 3D grid 22 inserted in the computer, with the understanding that the grid values define a continuous function through trilinear interpolation. This is a convolution with the function:

$$W_\alpha(x) * W_\beta(y) * W_\gamma(z), \text{ where } W_\alpha(x) = \begin{cases} 1 - \frac{|x|}{\alpha} & \text{for } |x| \leq \alpha \\ 0 & \text{for } |x| \geq \alpha \end{cases} \quad (3)$$

$$\text{or } F_{lin.int}(\overline{X}) = \sum_{n=-\infty}^{+\infty} \sum_{l=-\infty}^{+\infty} \sum_{m=-\infty}^{+\infty} F(n\alpha, l\beta, m\gamma) * W_\alpha(x - n\alpha) * W_\beta(y - l\beta) * W_\gamma(z - m\gamma) \quad (4)$$

The function $W_\alpha(\overline{X})$ is used to denote the interpolation function in 3D. Let $P^{(i)}$ denote the projection operation to the i:th view; then the contribution at $(x^{(i)}, y^{(i)}) = (x^{(i)})$ on the i:th tilt of grid value $F(\overline{X})$ at grid point X in the 3D grid will be:

$$F(\overline{X}) * P^{(i)} W_{\overline{\alpha}}(x^{(i)} - P^{(i)}\overline{X}) \quad (5)$$

And thus the i:th projected view $F^{(i)}(x^{(i)})$ is given by $$F^{(i)}(\overline{x}^{(i)}) = \sum_{\overline{X}} F(\overline{X}) * \{P^{(i)} W_{\overline{\alpha}}(\overline{x}^{(i)} - P^{(i)}\overline{X})\} \quad (6)$$

Each projected image is also subjected to convolution (denoted by $\otimes$) by the point spread function PSF:

$$F_{calc}^{(i)}(\overline{x}^{(i)}) = F^{(i)}(\overline{x}^{(i)}) \otimes \text{PSF}^{(i)} \quad (7)$$

Combining (6) and (7) we get $$F^{(i)}(\overline{x}^{(i)}) = \sum_{\overline{X}} F(\overline{X}) * ((P^{(i)} W_\alpha) \otimes \text{PSF}^{(i)})(\overline{x}^{(i)} - P^{(i)}\overline{X}) \quad (8)$$

Introducing the smearing function, the projected PSF, $$T^{(i)}(\overline{X}, \overline{x}^{(i)}) = ((P^{(i)} W\alpha) \otimes \text{PSF}^{(i)})(\overline{x} - P^{(i)}\overline{X}) \quad (9)$$

we can finally write for the projection $$F_{calc}^{(i)}(\overline{x}^{(i)}) = \sum_{\overline{X}} F(\overline{X}) * T^{(i)}(\overline{X}, \overline{x}^{(i)}) \quad (10)$$

In Fourier space, the PSF is the product of the pupil function and the CTF. Both the pupil and the CTF functions can change over the tilts (when recordings of a specimen is made using an electron microscope), since, in principle, each tilt can be recorded at a different focus with a different setting for the lenses in the electron microscope 10. For a given tilt, the PSF is only similar for points in a section, which is perpendicular to the beam direction, of the 3D density. However, if the specimen is not too thick, i.e. dynamic and multiple scattering can be neglected, the PSF is similar for all points in the 3D density. From the point of view of numerical calculation of the projection, an efficient implementation is to make use of this property for the projected PSF, i.e. creating a smearing function to be explained further below. Consequently the smearing function which can be accurately estimated with a small matrix need be computed for only one 3D point. The accurate projection is subsequently calculated by convoluting the projected density from its grid points with the smearing function. Tilted views have a focus gradient across the image and thus a varying PSF function of the 2D image. The projection can then be computed using a set of precomputed PSFs in the convolution calculation with the projected density. When focus variation must be considered for thicker specimens, the 3D density can be split up in layers of appropriate thickness, and each layer convoluted with its proper PSF. Subsequently, the summed density from all the layers gives the total projection. The densities in each projected images are given by the equation (1) above.

The iterative solution to the constraint maximum reconstruction can be formulated as $$F_{new}(\overline{X}) = F_{old}(\overline{X}) + \alpha^* u(\overline{X}) + \beta^* v(\overline{X}) \quad (11)$$

where $F_{new}(\overline{X})$ is the new calculated reconstruction, $F_{old}(\overline{X})$ is the next preceding calculated reconstruction, $u(\overline{X})$ is a function built from the gradient of the entropy (see equation 16), $v(\overline{X})$ is a function built from the gradients of the chi-squared statistic (see equation 17), and $\alpha$ and $\beta$ are scalars described further below. The updated map $F_{new}(\overline{X})$ is used in the next iteration cycle both as the density extimate and to generate the prior prejudice map.

The equation (11) shows how each estimated density distribution is updated to the next iteration cycle. The calculation is such that two features are provided at the same time, firstly maximising the entropy and secondly driving the reduced chi-squared statistic towards +1. If only the entropy were maximise d then only a blurred calculation would be provided.

The Chi-Squared Statistic

In each iteration cycle $F^{(i)}_{compare}(x^{(i)})$ is compared to $F^{(i)}_{obs}(X^{(i)})$, scaled in the operation 14, for the i:th projection according equation (1). Its chi-squared statistic $C^{(i)}$ is calculated:

$$C^{(i)} = \sum_{\overline{x}^{(i)}} \frac{1.}{\sigma_{(i)}^2(\overline{x}^{(i)})} [b^{(i)} * F_{calc}^{(i)}(\overline{x}^{(i)}) - F_{obs}^{(i)}(\overline{x}^{(i)})]^2 \quad (12)$$

where $\sigma_{(i)}^2(\overline{x}^{(i)})$ is the variance of the observed data for the ith projection at point x. This gives as total chi-squared statistic $$C = \sum_{i=1}^{i=tilts} C^{(i)} \quad (13)$$

The values $F_{campare}^{(i)}(\overline{x}^{(i)})$ should not be fitted better than their expected variances. Consequently, at the situation of optimal fit we get $$C = \sum_{i=1}^{i=tilts} (\text{Number of gridpoints})^{(i)} \quad (14)$$

A handy measure for monitoring of the chi-squared statistic is therefore the reduced chi-squared statistic $$C_r^{(i)} = \frac{C^{(i)}}{(\text{Number of gridpoints})^{(i)}} \xrightarrow{\text{optimal fit}} 1.00. \quad (15)$$

The Iterative Formulation

The construction of the 3D density $F(\overline{X})$ which maximises the entropy S in equation 2 while satisfying the condition (14) on the constraint function C proceeds iteratively from an initial estimate. At each iteration $F(\overline{X})$ is modified by a linear combination of two search direction $u(\overline{X})$ and $v(\overline{X})$, chosen as the normalized gradients of S and C according to:

$$u(\overline{X}) = \nabla_{\overline{X}}^N S \quad (16)$$

$$v(\overline{X}) = \nabla_{\overline{X}}^N C \quad (17)$$

Let $\alpha$ and $\beta$ denote the coefficients of $u(\overline{X})$ and $v(\overline{X})$ in the linear combination giving the correction in $F(\overline{X})$ at the current iteration. We then approximate the variations of S and C in the 2D search subspace spanned by $u(\overline{X})$ and $v(\overline{X})$ by quadratic models:

$$C(\alpha, \beta) = C(0,0) + \alpha * \langle u(\overline{X}) | \nabla_{\overline{X}} C(0,0) \rangle + \beta * \langle v(\overline{X}) | \nabla_{\overline{X}} C(0,0) \rangle + \quad (18)$$
$$\frac{1}{2} {}^t\!\begin{pmatrix} \alpha \\ \beta \end{pmatrix} \begin{pmatrix} \langle u(\overline{X}) | H(C) u(\overline{X}) \rangle & \langle u(\overline{X}) | H(C) v(\overline{X}) \rangle \\ \langle v(\overline{X}) | H(C) u(\overline{X}) \rangle & \langle v(\overline{X}) | H(C) v(\overline{X}) \rangle \end{pmatrix} \begin{pmatrix} \alpha \\ \beta \end{pmatrix}$$

$$S(\alpha, \beta) = S(0,0) + \alpha * \langle u(\overline{X}) | \nabla_{\overline{X}} S(0,0) \rangle + \beta * \langle v(\overline{X}) | \nabla_{\overline{X}} S(0,0) \rangle + \quad (19)$$
$$\frac{1}{2} {}^t\!\begin{pmatrix} \alpha \\ \beta \end{pmatrix} \begin{pmatrix} \langle u(\overline{X}) | H(S) u(\overline{X}) \rangle & \langle u(\overline{X}) | H(S) v(\overline{X}) \rangle \\ \langle v(\overline{X}) | H(S) u(\overline{X}) \rangle & \langle v(\overline{X}) | H(S) v(\overline{X}) \rangle \end{pmatrix} \begin{pmatrix} \alpha \\ \beta \end{pmatrix}$$

The first order derivatives of C and S with respect to $\alpha$ and $\beta$ are:

$$\frac{\partial C}{\partial \alpha} = \langle u(\overline{X}) | \nabla_{\overline{X}} C(0,0) \rangle = \sum_X \nabla_{\overline{X}}^N S(0,0) * \nabla_{\overline{X}} C(0,0) \quad (20)$$

$$\frac{\partial C}{\partial \beta} = \langle v(\overline{X}) | \nabla_{\overline{X}} C(0,0) \rangle = \sum_X \nabla_{\overline{X}}^N C(0,0) * \nabla_{\overline{X}} C(0,0) \quad (21)$$

$$\frac{\partial S}{\partial \alpha} = \langle u(\overline{X}) | \nabla_{\overline{X}} S(0,0) \rangle = \sum_X \nabla_{\overline{X}}^N S(0,0) * \nabla_{\overline{X}} S(0,0) \quad (22)$$

$$\frac{\partial S}{\partial \beta} = \langle v(\overline{X}) | \nabla_{\overline{X}} S(0,0) \rangle = \sum_X \nabla_{\overline{X}}^N C(0,0) * \nabla_{\overline{X}} S(0,0) \quad (23)$$

The second order derivatives (the elements of the Hessian matrices in (18) and (19)) of C with respect to $\alpha$ and $\beta$ are:

$$\frac{\partial^2 C}{\partial \alpha \partial \beta} = \frac{\partial^2 C}{\partial \beta \partial \alpha} = \langle u(\overline{X}) | H(C) v(\overline{X}) \rangle \quad (24)$$
$$= \sum_{i=1}^{i=tilts} \sum_X \sum_Y \sum_{\overline{x}^{(i)}} O^{(i)}(\overline{X}, \overline{Y}, \overline{x}^{(i)}) u(\overline{X}) \frac{v(\overline{Y})}{\sigma_{(i)}^2(\overline{x}^{(i)})}$$

The function $o^{(i)}(\overline{X}, \overline{Y}, \overline{x}^{(i)})$ is an overlap function, is $>0$ and is defined by the smearng function (see equation 9)

$$O^{(i)}(\overline{X}, \overline{Y}, \overline{x}^{(i)}) = T^{(i)}(\overline{X}, \overline{x}^{(i)}) * \sum_{\overline{y}^{(i)}} T^{(i)}(\overline{Y}, \overline{y}^{(i)}) \quad (25)$$

However, the smearing function only has a significant value at a limited number of grid points. Thus, it is convenient to write $$\text{over}^{(i)}(\overline{x}^{(i)}, \overline{y}^{(i)}) = o^{(i)}(\overline{X}, \overline{Y}, x^{(i)}), \quad (26)$$

remembering that for each coordinate on $i^{th}$ tilt, the list of overlap values $>0$ is small.

The time needed for calculating expression (24) must be reduced before an attempt to evaluate it is made. Even for a small case with $10^2$ tilts, $10^4$ points per tilt and $10^6$ gridpoints in the 3D volume, the expression in (24) implies the evaluation of the overlap function (25) at $10^{18}$ points.

For a fast computer with a capacity of $10^8$ expressions evaluations per second, it would still take approximately 300 years to evaluate the formula. The size of the calculation can be reduced by making use of the reasonably good approximation that the smearing function is similar for all the different 3D grid points (at the least, it is similar for those points in layers perpendicular to the beam direction, see the discussion following equation (10)

$$\frac{\partial^2 C}{\partial \alpha \partial \beta} = \frac{\partial^2 C}{\partial \beta \partial \alpha} = \sum_{i=1}^{i=tilts} \sum_{\overline{x}^{(i)}} \frac{1}{\sigma_{(i)}^2(\overline{x}^{(i)})} P^{(i)} u(\overline{x}^{(i)}) + \quad (27)$$
$$\sum_{\overline{y}^{(i)}} \text{Over}^{(i)}(\overline{x}^{(i)}, \overline{y}^{(i)}) * P^{(i)} v(\overline{y}^{(i)})$$

From (27) we see that these Hessian matrix elements (the elements of the Hessian matrices in (18) and (19)) can be readily computed by projecting the entropy and the chi-square gradients and then multiplying the projections through a limited convolution with the overlap function. Instead of 300 years of evaluation time, this expression can be evaluated in about 1 minute, a speed-up of $10^8$ times!

The second order derivatives of S with respect to $\alpha$ and $\beta$ are:

$$\frac{\partial^2 S}{\partial \alpha^2} = \langle u(\overline{X}) | H(S) u(\overline{X}) \rangle = -\sum_X \frac{u^2(\overline{X})}{F(\overline{X})} \quad (28)$$

$$\frac{\partial^2 S}{\partial \alpha \partial \beta} = \frac{\partial^2 S}{\partial \beta \partial \alpha} = \langle u(\overline{X}) | H(S) v(\overline{X}) \rangle = -\sum_X \frac{u^2(\overline{X}) v(\overline{X})}{F(\overline{X})} \quad (29)$$

$$\frac{\partial^2 S}{\partial \beta^2} = \langle v(\overline{X}) | H(S) v(\overline{X}) \rangle = -\sum_X \frac{v^2(\overline{X})}{F(\overline{X})} \quad (30)$$

The gradients $\nabla_{\overline{X}} C$ and $\nabla_{\overline{X}} S$ are calculated in the following way $$\nabla_{\overline{X}} S = \frac{\partial S(F)}{\partial F(\overline{X})} = -\int \left( \frac{\partial F(\overline{Y}) \ln\left(\frac{F(\overline{Y})}{m(\overline{Y})}\right)}{\partial F(\overline{X})} \right) d\overline{Y} \quad (31)$$
$$= 1 - \ln\left(\frac{F(\overline{X})}{m(\overline{X})}\right)$$

-continued $$\nabla_{\overline{X}} C = \frac{\partial C}{\partial F(\overline{X})} = \sum_{i=1}^{i=tilts} \left( \frac{\partial C^{(i)}}{F(\overline{X})} \right) = \sum_{i=1}^{i=tilts} \nabla_{\overline{X}} C^{(i)}. \quad (32)$$

Using the chain rule, we can write $$\nabla_{\overline{X}} C^{(i)} = \frac{\partial C^{(i)}}{F(\overline{X})} = \sum_{\overline{x}^{(i)}} \frac{\partial C^{(i)}}{\partial F_{calc}^{(i)}(\overline{x}^{(i)})} * \frac{\partial F_{calc}^{(i)}(\overline{x}^{(i)})}{\partial F(\overline{X})} \quad (33)$$

From equation (12) we see that $$\frac{\partial C^{(i)}}{\partial F_{calc}^{(i)}(\overline{x}^{(i)})} = \frac{2b^{(i)}}{\sigma_{(i)}^2(\overline{x}^{(i)})} * [b^{(i)} * F_{calc}^{(i)}(\overline{x}^{(i)}) - F_{calc}^{(i)}(\overline{x}^{(i)})] \quad (34)$$

and from equation (10) we get $$\frac{\partial F_{calc}^{(i)}(\overline{x}^{(i)})}{\partial F(\overline{X})} = T^{(i)}(\overline{X}, \overline{x}^{(i)}) \quad (35)$$

Thus equation (33) can be written as $$\nabla_{\overline{X}} C^{(i)} = \frac{\partial C^{(i)}}{F(\overline{X})} = \sum_{\overline{x}^{(i)}} \frac{2b^{(i)}}{\sigma_{(i)}^2(\overline{x}^{(i)})} * \quad (36)$$

$$[b^{(i)} * F_{calc}^{(i)}(\overline{x}^{(i)}) - F_{calc}^{(i)}(\overline{x}^{(i)})] * T^{(i)}(\overline{X}, \overline{x}^{(i)})$$

With equation (36), it can be seen that all physical and numerical parameters needed to compute equations (18) and (19) are known, and the calculation is feasible. The iterative solution to the constrained maximum entropy tomography reconstruction in equation (11) is hereby completed.

Thus, as seen in the computer block 12 in FIG. 1, in accordance with the iteration equation (11) above, the output $F_{new}$ from the calculation means 15 is fed to a normalization operation 22 which feeds $F_{old}$ as an input to 15. $u_{new}(\overline{X})$ is normalized in an operation 23 and $v_{new}(\overline{X})$ in an operation 24. The outputs of 23 and 24 are provided as inputs to the calculation means 15 together wit their respective scalars. The new $m(\overline{X})$ is also normalized in an operation 25 which feeds it as an input to the calculation means 15.

The scalars I and J can be determined by solving a generalized eigenvalue problem in a wellknown way, for instance the way described by G. Bricogne, Acta Crystallographica A40, pp 410–445 (1984). The updated map $F_{new}(\overline{X})$ is used in the next iteration cycle both as the density estimate and to generate the prior prejudice map.

The constraint on reduced chi-squared statistics ensures that the reconstructed density is consistent, but not over-consistent with its observed projections.

Figure 2A:
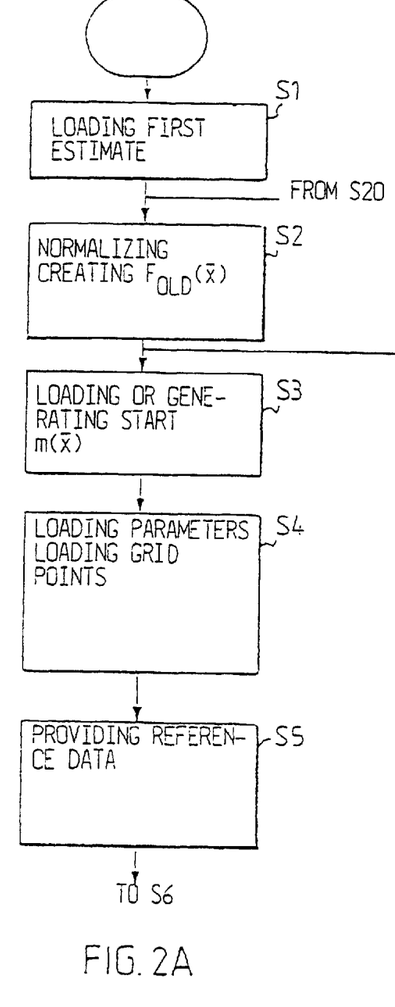
FIGS. 2A to 2C show flowcharts of preferred programs for the computer shown in FIG. 1.
Figure 2B:
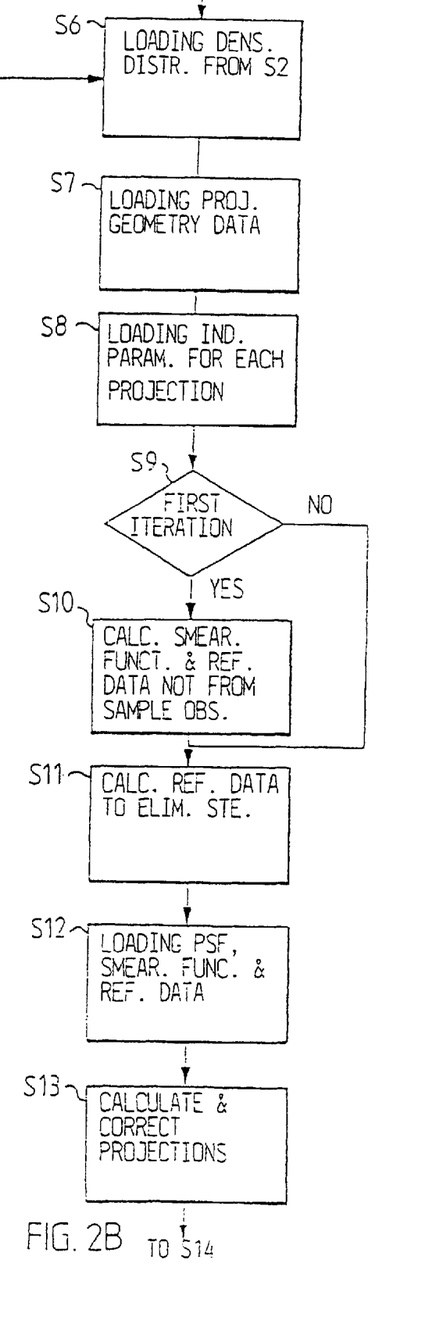
Figure 2C:
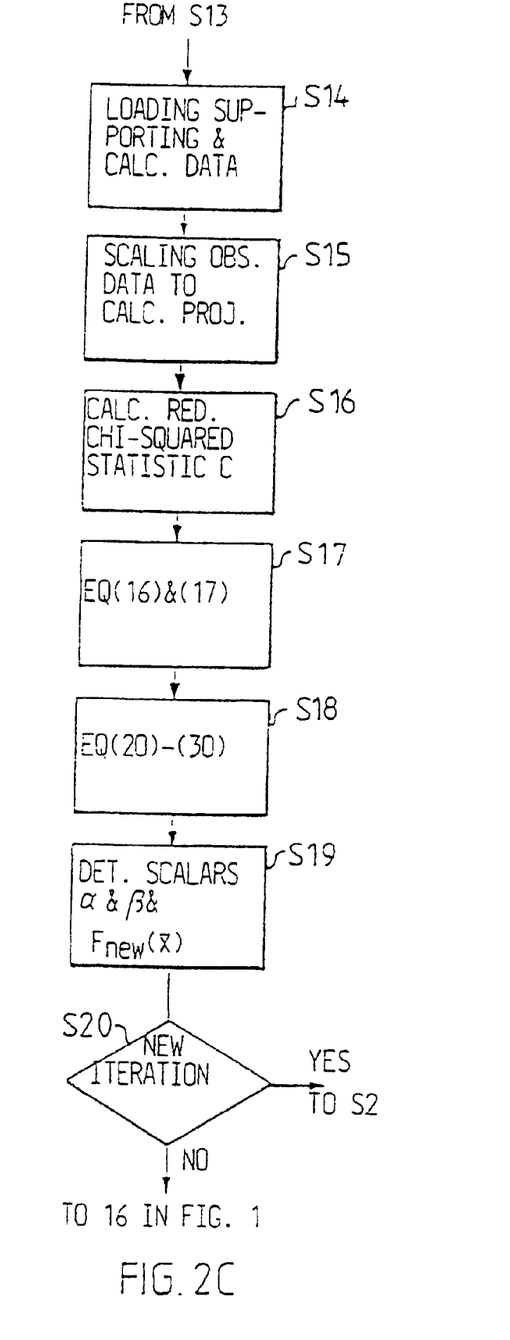

The calculations in the computer are illustrated in the flow chart in FIGS. 2A to 2C and will now be further described. The program is preferably divided into three different subprograms.

First Subprogram in FIG. 2A
  S1. Loading the first estimate of the density distribution from the unit 19 in FIG. 1.
  S2. Normalization of the estimate $F(\overline{X})$ so that $\int F(\overline{X})dX=1$ This is used as the $F_{old}(\overline{X})$, a prior density distribution that is used as a starting value for the iteration to be done, in which the equation (11) is to be calculated.
  S3. Loading a prior price (initial knowledge) distribution $m(\overline{X})$, or generating it by blurring the estimate distribution with a gaussian and a spherical filter, and normalizing $m(\overline{X})$.
  S4. Insertion of parameters, such as projection scale, variances, guide functions etc.
    Insertion of the number of grid points.
  S5. Reference data for improving the scaling is calculated in each iteration cycle in order to monitor and eliminate "series termination errors" during limited Fast Fourier Transform calculation. This is a condition for the scaling done by the third subprogram in FIG. 2C. The accuracy is needed so that the scaling is accurate enough to make the measured differences relevant.

Second Subprogram in FIG. 2B (Generates the Projections)
  S6. Loading prior density distribution from S2.
  S7. Loading geometry data describing the projection geometry.
  S8. Loading individual parameters for each projection defining how they were taken, for instance acceleration voltage, astigmatism, lens assymetry, focus, chromatic and/or spherical abberation or the like.
  S9. Is this the first iteration? If yes then go to S10, if no then go to S11.
  S10. Calculation of overlap functions (○), "smearing functions" and recognising that they have significant values at a limited number of grid points. Calculating reference data not coming from the observations of the sample, i.e. calculation of projections with eliminated data.
  S11. Calculation of reference data in order to eliminate "series termination errors" by the limited Fast Fourier Transform calculation at applications of PSF.
  S12. Loading the precalculated PSF (point spread function) from the unit 17 in FIG. 1 (or loading optical parameters derived from measurements of the microscope 10 and calculating its PSF). Loading the calculated smearing functions and reference data.
  S13. Calculation of projections. Correcting every projection by the optical parameters defining the PSF. Determining the number of 2D projections to process.

Third Subprogam in FIG. 2C (the 3D Calculation)
  S14. First a lot of supporting data and data calculated in the other subprograms are inserted, such as:
    Conditions for the iterations to start and to stop for presenting the provided result.
    Loading the observed projections.
    The sorted projections provided in point S13.
    The variances for each grid point. These variances are either measured or modelled since it is a Poisson distribution.
    Size data.
    Series termination errors.
    Geometry description in order to make projections in right directions.
    The image parameters.
    The number of 2D projections etc
    The essential features are however that the observed and calculated projections and the variances are inserted.
  S15. Scaling in order to denormalize calculated projections against observed data in order to provide a common level and to be aware of how an absolute level is to be provided. A certain electron dose for the specimen corresponds to a certain grey scale giving for instance molecular weight.

S16. Calculating the reduced chi-squared statistic and goodness of fit parameters (sums of quadrated deviations) by comparing the scaled, calculated projections to the observed data for monitoring progress from one iteration cycle to the next one.

S17. Approximating reduced chi-squared statistics and entropy by quadratic models close to the current trial solution $F(\overline{X})$ using the equations (16) and (17).

S18. Calculating the total entropy of the density estimate and total reduced chi-squared statistic for scaling purposes.

The first order derivatives of C and S with respect to $\alpha$ and $\beta$ are derived from the equations (20) to (23).

Calculating gradients of the entropy and the reduced chi-squared statistic as well as the other derivatives (Hessian matrix elements) from the equations (27) for the reduced chi-squared statistic and equations (28) to (30) for the entropy by projecting the 3D gradients of the entropy and the reduced chi-squared statistic (equation 27).

All these gradients and the overlap function calculated in step S12 are needed for the quadratic model and are used in the equations (16) and (17).

S19. Solving the coefficients $\alpha$ and $\beta$ of $u(\overline{X})$ and $v(\overline{X})$.

Updating the density with the parameters according to the equation (11). Determining $\alpha$ and $\beta$ from the point where the entropy is maximise d and the reduced chi-squared statistic is driven towards +1 using said parameters. Calculating $F_{new}(\overline{X})$ in equation (11).

S20. If a new iteration is to be made (conditions for iterations could be that they are done in a predetermined number of cycles or that they are done to a prescribed correlation limit or until the entropy maxination will be weakened) go to S2 else provide the completed reconstruction on the input of the presentation device 16 in FIG. 1.

Thus, when the calculations described above are completed, the 3D image is reconstructed from the iteratively calculated data, and the reconstruction data is fed to the visual display means of the presentation device 16, where it provides a visible image of an object, which, when having no symmetry could not be visible by any other known means.

Computing the second order derivatives uses, among others, a function $o(i)(\overline{X},\overline{Y},x(i))$, which is an overlap function defined by the smearing function $T(i)(\overline{X},\overline{x}(i))$, but the smearing function is a measure of how much the density value in each point is influenced by the other points. In fact, only a limited number of neighbouring points influence each point, and thus. the smearing function only has a significant value at a limited number of grid points. This reduces the size of the calculations.

With a method according to the invention, the known equations are paramethdsized to a level where the physical meaning of each component can be identified. This means that the right values can be assigned and intelligent suggestions can be made, which in turn makes the equations possible to solve.

The difference between projected data and observed data is also minimised. (32) and (33) to (35) relate the gradient error in 3D to the error in 2D and if used together with the second order derivatives makes it possible to solve (15) and (16), which give the variation of the total C and S and thereby enable maximising S and minimising C towards are ±1.

FIGS. 3A to 3D illustrate how the feasibility and correctness of the reconstruction made according to the invention has been tested by reconstructing the unstained and vitrified adenovirus from electron micrographs and compared to projections of the observed data and to projections provided with another 3D reconstruction method.

Figure 3A:
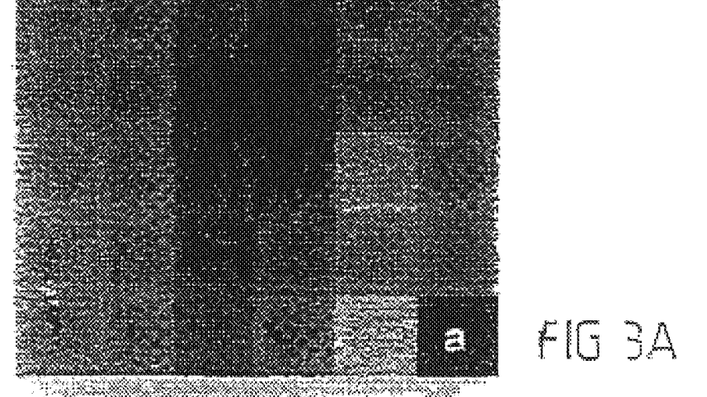
FIGS. 3A, 3B and 3C show 2D projections firstly recorded by an electron microscope of an adenovirus particle, secondly recorded from a reconstruction done according to a conventional method, and thirdly recorded from a reconstruction done according to the invention.

FIG. 3A is observed data show of 2D-projections recorded by an electron microscope of an adenovirus particle, which is icosahedral with a maximum diameter of 1400 Å, including twelve fibres protruding from twelve vertices. Without the fibres, the virus can be contained in a sphere with a diameter of 914 Å.

Figure 3B:
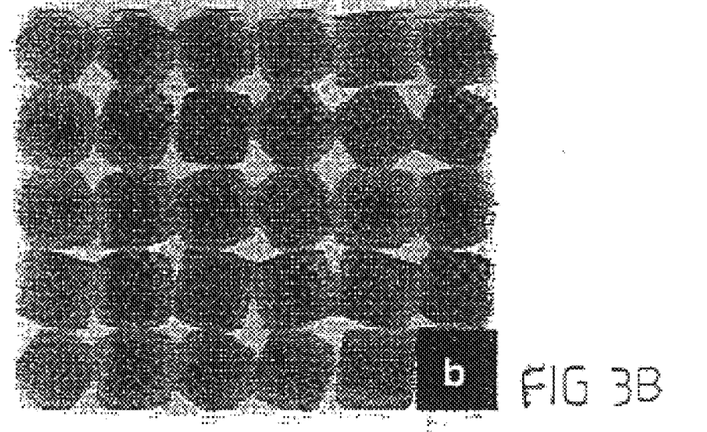

FIG. 3B shows a reconstruction of the adenovius in 3D to approximately 35 Å resolution, made by aid of a CL method described by Crowther, R. A. in 'Philosophical Transactions of the Royal Society of London' B261, pp221–230 (1971) and modified and improved by S. D. Fuller as described in Cell 48, pp 923–934 (1987). The CL method is of another kind than the inventive method. According to the CL method a brief 3D image is reconstructed and is thus not as refined as the inventive method and lacks among other things the prior prejudice approach. A refinement of the reconstruction made by the CL method could then be provided in several conventional ways. The particle is contained in a cube with sides of 135 pixels and is projected onto a 150×150 pixel canvas.

Figure 3C:
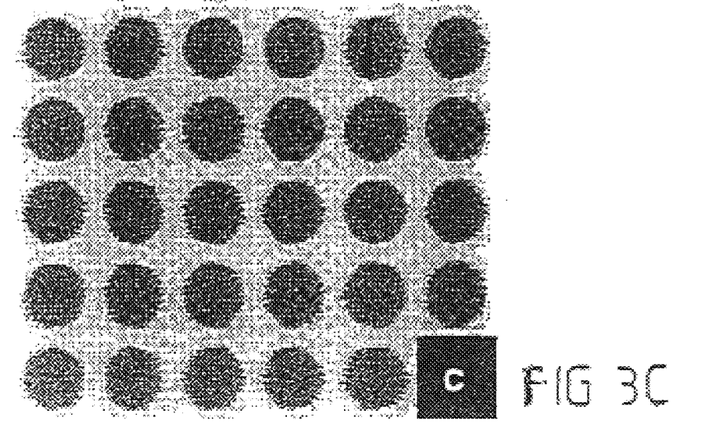

FIG. 3C is projections from a reconstruction made according to the invention. The projection geometry in FIG. 3C is the same as in FIG. 3B. The background is so low in FIG. 3C that it is hard to distinguish the projected background of the virus inside the cube from the canvas with no projected values.

As mentioned above when disclosing the elements 10, 11 and 18 in FIG. 1 the CTF (Contrast Transfer Function) could be supplied as an experimental curve or as parameters refined from a parametrized model. In accordance with the numerical recipes following Eq. 10 above, a compensation also could be provided for a CTF due to the focus gradient in tilted views or thick specimens. Because this entails a more complicated summation scheme for the projected PSF function (defined in Eq. (9)) the evaluation of the Eqs. 10, 25, 27 and 35 is also correspondingly more elaborated in the inventive implementation. In the case of a constant PSF, (Point Spaced Function) the evaluation is a straightforward evaluation as indicated by the formulas. In the example described above, the possibility of a varying PSF function was not applied since the micrographs of the specimen, adenovirus, were recorded with nearly the same defocus and from untilted views, and the focus variation across the virus in the beam direction was neglected.

It is also within the scope of invention to have a sample to be reconstructed to be an outcut envelope from an object to be observed. The rest of the object is then a buffer which can be reproduced from iteration to iteration without reconstruction, i.e. unchanged. Normally, the iteration work is done when calculations are made on a field. However, when reconstruction is to be done on for instance an icosaedric virus the interesting part of it could perhaps only be its shell. Then, the program in the reconstruction device will provice an envelope at the place of the shell to be reconstructed and image the rest of the virus as some kind of noice level. If a symmetric body is to be reconstructed then only one of the symmetric parts could be reconstructed and the program coult then join the symmetric parts reconstructed after that the reconstruction of the reconstructed part is done.

Expansions of the same concept could also be made is a situation when some of the parts of the concept are previously known. Assume that a reconstruction should be done of a big molecular complex. At least one of the molecules in the complex which place in the complex is known could be found in a manual or the like. Its atomic structure at high resolution happens to be well known. This density distribution could thus be generated and inserted in the reconstruction system. That part is then cut out from the reconstruction, i.e. an envelope is done of the other parts excluding the well known part. The reconstruction of the complicated structure could then be done using fewer variables and fewer degrees of free-dom than if the reconstruction was made on the whole structure and with the same result. This implies that the numerical force could be enhanced for the rest of the structure.

Thus, it is possible to insert known fragments in the object to be reconstructed and thus enhance the resolution of the remaining parts. For instance at a tomographic reconstruction of a patient having injured tissue but for instance the bones are intact then the bones need not be reconstructed and thus only the tissue.

Description of a Second Embodiment

Figure 4:
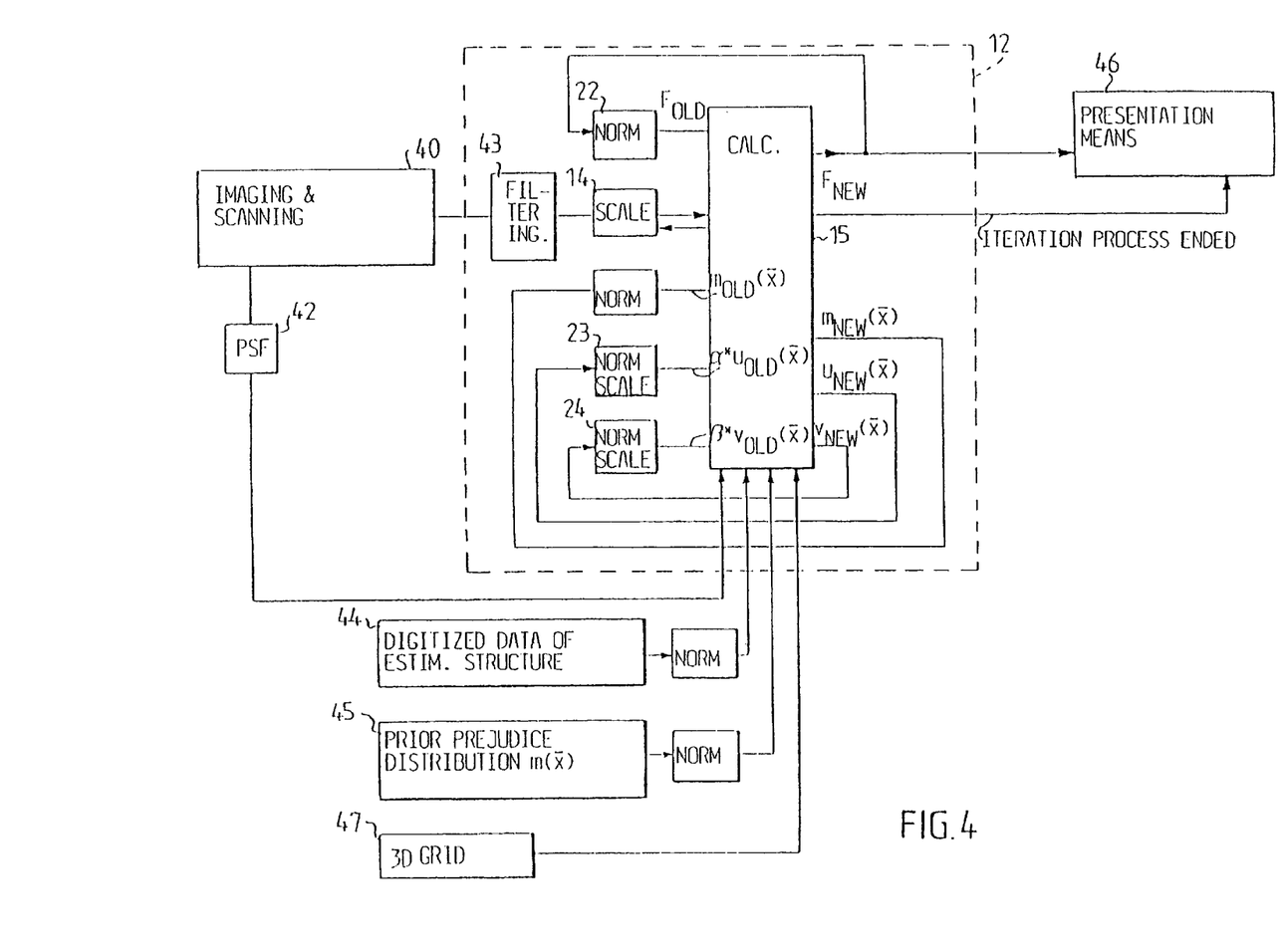
FIG. 4 shows a functional block diagram of a second embodiment of the invention.

FIG. 4 shows a second embodiment of an apparatus for data acquisition and processing according to the invention, used in order to achieve a 2D image reconstruction at high resolution of a picture which is presented for instance on a television monitor or on paper or as an oil-painting or the like. In the 3D reconstruction described above the projection data was provided as 2D projections. In the 2D reconstruction in this embodiment the "projections" are provided as lines. Elements corresponding with elements in FIG. 1 have the same reference numerals. It is to be noted that the calculation device preferably is a fast computer being able to process images at least with the same speed as the vertical rate of a TV-monitor.

An imaging and scanning unit 40 is connected to an input of a filtering and normalization means 43 comprised in the computer 12. The imaging and scanning unit is scanning a picture or a TV screen on which a picture is presented. When scanning a picture on a TV screen several scanning sequences are done for each picture in order to have an overdetermination of it, since the meaning of providing this inventive kind of operation is to enhance the image resolution. The output of said filtering and normalization means 43 is connected to an input of the calculation means 15 also comprised in the computer 12. The imaging and scanning unit 40 is also connected to a point spread function generator 42, the outputs of said function generators being connected to the computer 12. An output of the calculation unit 15 is connected to a presentation means 46 which in this embodiment when processing TV picures for instance could be a large sized high resolution screen or the like.

The computer 12 is supplied with digitized image data from a unit 44 for providing digitized data of an estimated structure. The unit 44 could comprise the television receiver unit itself or a video camera directed to the picture to be processed and an A/D converter. However, almost any picture scanning data could be presented as the estimated structure but the computing will be faster if the resemblance between the picture to be processed and the estimated picture is good. The output of the unit 44 is normalized before it is fed to the calculating means 15 in the computer 12.

A prior prejudice distribution $m(\overline{X})$ is either inserted separately to the calculating means in the computer 15 by a unit 44 or created by the calculating means 15 itself by blurring the estimated structure by making a Fourier transform and multiplying the coefficients of this Fourier transform with the Fourier coefficients of a gaussian and spherical filter. The prior prejudice distribution is normalized.

Since the resolution in the processed picture is to be enhanced a rather dense 2D grid 47 is fed into the computer 12.

The computation will be done according to the same principles as described above but in a less complicated way.

The data is processed in accordance with the inventive method, so that a higher resolution and a lower noise level is achieved than is possible using conventional techniques. The processed data is then fed to the presentation means 16 where it provides an image of greatly improved quality.

Description of a Third Embodiment

Figure 5:
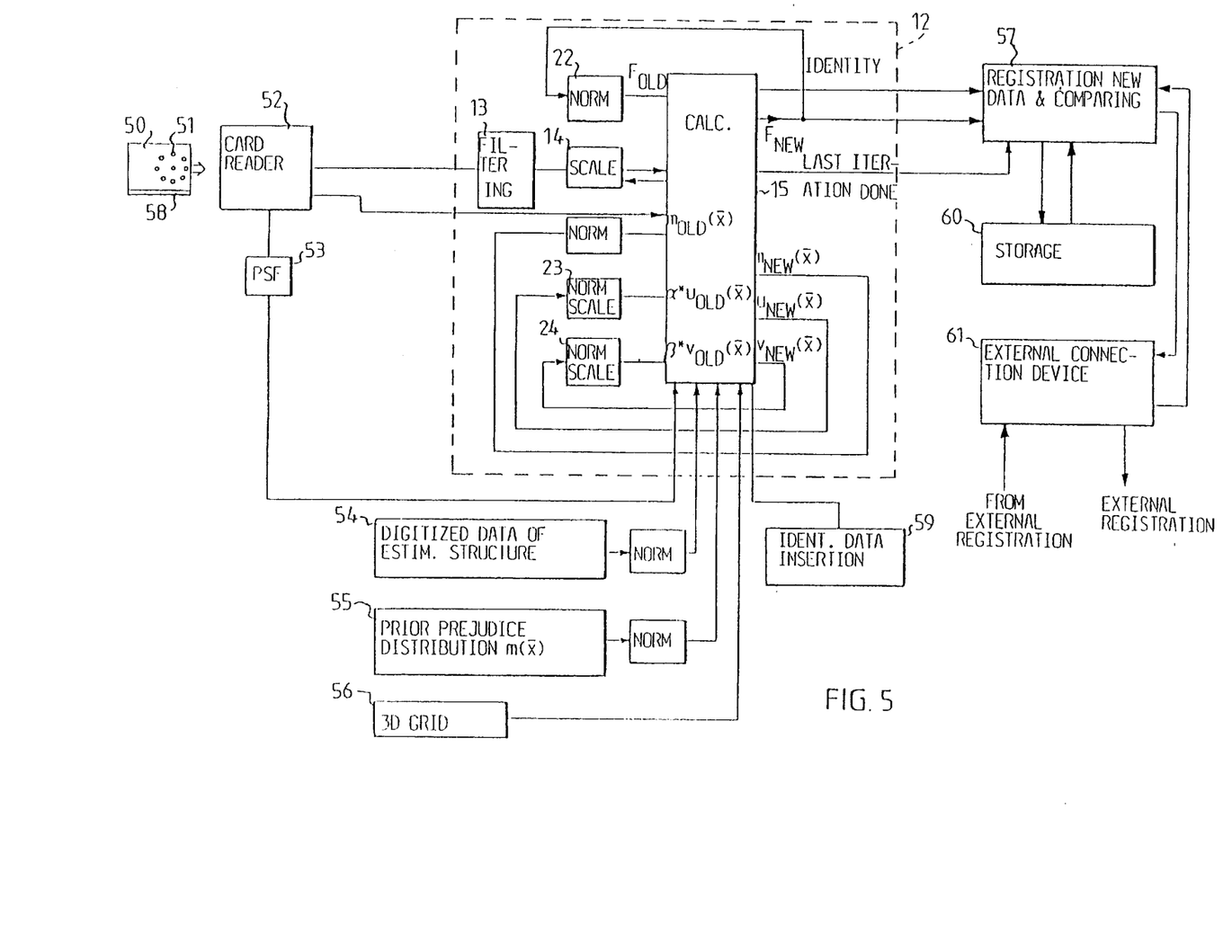
FIG. 5 shows a functional block diagram of a third embodiment of the invention.

This embodiment is a card reading unit for checking pass-cards and processes data in 3D form. It relates to a kind of pattern reconstruction. A card 50 having a number of small designs 51 being slightly different but which for the naked eye seems to be the same is inserted in a card reader 52. The designs could illustrate almost anything, such as stars, rings, clouds, trees, bears. The designs 51 have the same positions in all cards adapted to be read by the card reader 52 having either an individual scanning device per design or having a movable scanning device scanning the designs in sequence. The scanned designs could be regarded as different 2D projections of a 3D sample and are presented to the filtering means 13 in the computer 12. However, the filtering process could be extensively simplified as compared to what is necessary in the embodiment according to FIG. 1, since the card reader could be designed such that there is no need for processing regarding geometry description and bringing the projections in harmony with each other.

Parameters for providing a PSF 53 of the card reader 52 is fed to the calculating means 15 in the computer 12. The computer is a part of the card reading unit and this means that these parameters could be presented to the computer during manufacture and the PSF could be calculated and stored at that time.

The digitized data of estimated structure 54 could also be provided and normalized during manufacture for instance comprising designs of the same structure as on the card but for instance all being exactly alike or else being read from a reference card provided in the card reader in the factory and normalized and stored permanently.

The prior prejudice distribution $m(\overline{X})$ 55 could also be normalized and stored permanently at the factory and also the 3D grid 56.

The computer processes the data in the way described above and send the result to a unit 57 when the last iteration is done. The card 50 could have a conventional magnetic strip 58 or the like providing a simple identification of the card. Alternatively, the card owner could have a personal code or the like inserted through an identical data insertion means which could be a keyboard, a voice identifier or the like.

When a card 50 is inserted into the card reader 52 the identity of the card is read from the strip 58 and provided directly to the calculating means 15 which in turn feeds it to the unit 57. The unit 57 cooperates with a storage 60 having processed data of cards stored in addresses identified by the identity of the card.

If the inserted card has been used earlier the data for it is found and delivered to the unit 57. When the processing operation of the designs on the card is ready the unit 57 compares the stored processed data with the new one and accepts a card only for a true compare.

If the inserted card has not been used before and thus data of it is not stored then an identity check could for instance be provided in an external register through an external connection device 61.

This device could also receive updated information about cards from a central office. The identity cards could be used in offices to provide passage to different regions in a building or the like. In this connection, there is frequently a need for registration and deregistration of cards.

If data is found in the external register with a register mark that it is allowed for the card reading unit in question then it could be transported to the unit 57 which stores the data in the storage 60 and also makes the checking comparison with the newly processed data.

Another possibility is that when a new card is issued and handed over to a card owner then registration data such as the information on the strip 58 is sent over to the unit 57 through the device 61. The unit 57 stores the registration data. The first time the card is inserted in the card reader and the data from the designs 51 are calculated by the computer the data is stored in the storage 60 and the card owner can pass.

Still another possibility is to have the data from a lot of cards stored in the storage 60 in dummy addresses and to change the address to an ordinary one by distant control as soon as a card is handled over to a new owner.

If a deregistration information for a card is fed to the device 61 then the unit 57 could either put a note in the store registration that the card is invalid or erase the data.

While the invention has been described with reference to specific embodiments, it will be understood by those skilled in the art that various changes may be made and equivalents may be substituted for elements thereof without departing from the true spirit and scope of the invention as stated in the claims. In addition, modifications may be made without departing from the essential teachings of the invention as apparent from the claims. For instance, the teachings of the inventions is also adaptable on 1D data reconstruction, such as on several temperature measurements in one occation or the like. In such a case an input device connected to the computer 12 records variation of the quantity in relation to a predetermined variable and the calculation means reconstructs the measured quantity as a series of measurement data. An application on telecommunication is also supported by the invention, for instance by making an oversampling on each sampled analog signal. Even though 3D imaging of smaller objects is described in the first embodiment 3D imaging of larger objects, for instance tomographic recordings, such as PET scanning (PET=Position Emission Tomography), is supported by the invention. The invention is also applicable on holography both on thin film and volume holograms. Other applications relates to nuclear medicine, X-ray diagnostic imaging, such as mamography and odontologic imaging, ultra sound imaging, radar imaging, IR-imaging, meteorological charts, geographical sharts, CT scanning etc.

What is claimed is:

1. A method for providing high fidelity reconstruction built on a grid having grid points of an observed sample, said method comprising the following steps:

providing several recorded, observed data of the sample, each from a different aspect of the sample;

providing an initial estimated densitiy distribution of the sample at the individual grid points;

providing a blurred prior prejudice density distribution at the individual grid points using estimated data;

calculating in an iterative process for each iteration:

a new estimated distribution of the sample at the grid points using the prior prejudice density distribution and comparison between the estimated distribution in the next preceding iteration and the recorded, observed data of the sample, a new prior prejudice density distribution at the individual grid points on the new estimated distribution less blurred regarding the density distribution at the grid points than the prior prejudice distribution in the next preceding iteration;

continuing the iterations until the difference between the new estimated distribution and the next preceding estimated distribution is less than a predetermined density resolution distribution condition on the grid points.

2. A method according to claim 1, in which blurring is provided by making a Fourier transform of the estimated structure and by multiplying the coefficients of this Fourier transform with the Fourier coefficients of a gaussian and spherical filter.

3. A method according to claim 1, in which said blurred structure is normalised before it is used as the new prior prejudice distribution in the next iteration cycle.

4. A method according to claim 1, in which the sample to be reconstructed is an outcut envelope from an object to be observed; and that the rest of the object is a buffer and is reproduced from iteration to iteration without reconstruction.

5. A method according to claim 1 comprising the following steps:

a) providing several recorded observed data of the sample, each from a different aspect of the sample;

b) providing a variance for individual observation grid points in each recorded observed data;

c) calculating the reconstruction of the observed sample structure in the iterative process taking said initial estimated distribution as a first iteration reconstruction approximation;

d) for each iteration:

calculating said new prior prejudice distribution using the next preceding reconstruction result, calculating a reduced chi-squared statistic (C) using the immediately preceding calculated reconstruction, the recorded observations and said variance, and the grid, while maintaining normalization of the calculated reconstruction, calculating an entropy (S) using the immediately preceding calculated reconstruction and the new prior prejudice distribution;

e) maximising the entropy under the constraint of driving the reduced chi-squared statistic towards +1, and providing a new calculated reconstruction to use in the next iteration cycle; and f) presenting the reconstruction.

6. A method according to claim 1, further comprising providing a point spread function being a convolution using qualities of the recording device;

providing a projected point spread function, called smearing function, on the calculated reconstruction;

approximating that the smearing function is greater than zero only for a limited number of grid points of said sample; and producing a structure whose projection convoluted with the point spread function will adapt to the observed structure.

7. A method according to claim 6, further comprising providing an overlap function defined by the smearing function, and driving said reduced chi-squared statistic towards +1, and maximising the entropy, using said overlap function.

8. A method according to claim 7, wherein the several recorded observation data of the sample are provided by recording means supplying 2D projections in digitized form of the sample and forwarding the data contained in them to the calculation means in order to provide a 3D image reconstruction, characterized by processing said data with the use of an approximation that the smearing function is greater than zero only for a limited number of grid points in a layer perpendicular to the beam direction and in producing the 3D structure whose projection convoluted with the point spread function will adapt to the observed structure.

9. A method according to claim 1 for a 3D reconstruction of a sample, characterized in that said observations of the sample are a series of differently tilted 2D observations of the sample.

10. A method according to claim 1 for a 3D reconstruction of a sample by means of light recordings, characterized in that said observations from different aspects of the sample are a series of 2D observations focused at different depths of the sample.

11. A method according to claim 1, characterized in that the reconstruction is provided of organic objects, for instance small organic objects, such as virus particles or the like.

12. A method according to claim 1, characterized in that the reconstruction is a pattern reconstruction of sample elements (51) having slightly different designs provided on a card (50) in order to provide a secure and unique identity of the card.

13. A method according to claim 1 for a 2D reconstruction, characterized in that the different aspects of the sample are lines across the sample.

14. An apparatus for providing high fidelity reconstruction of an observed sample of an object built on a grid having determined grid points, said apparatus comprising:

input means (10, 11, 13, 14; 40, 43, 14; 52, 13, 14) providing observed data of the sample;

estimated distribution means (19; 44; 54) providing an initial estimated density distribution of the sample on the individual grid points;

prejudice distribution means (21, 25, 15; 45, 15; 54, 15) providing a blurred prior prejudice density distribution on the individual gird points using estimated data;

calculating means (12), cooperating with said sample observation means, estimated distribution means and prejudice distribution means, for calculating in an iterative process for each iteration:

a new estimated density distribution of the sample on the grid points using the prior prejudice density distribution and comparison between the estimated density distribution in the next preceding iteration and said observed data of the sample from said input means, a new prior prejudice density distribution on the individual grid points on the new estimate less blurred than the prior prejudice distribution in the next preceding iteration;

said calculation means (12) is adapted to continue the iterations until the difference between the new estimated density distribution and the next preceding estimated density distribution is less than a predetermined condition; and means (16; 46; 57) connected to said calculation means for presenting the calculated result.

15. An apparatus according to claim 14, in which said input means (10, 11) measures several aspects of a quantity (1), characterized by means for providing a variance for individual observation grid points in each recorded observation;

said calculation means (12) for each iteration cycle provides the following calculations:
a new prior prejudice distribution,
an entropy (S) using the immediately preceding calculated reconstruction and the new prior prejudice distribution,
a reduced chi-squared statistic (C) using the immediately preceding calculated
reconstruction, the observed data of the sample, said variance, and said grid, while maintaining normalization of the calculated reconstruction, under the constraint of maximising the entropy relative to the prior prejudice while driving the reduced chi-squared statistic towards +1 and maintaining normalization, and providing a new calculated reconstruction to use in the next iteration cycle.

16. An apparatus according to claim 15, characterized by means (18; 42; 53) feeding a point spread function of the input means, being a convolution, to said calculation means;

said calculation means (12) calculating a projected point spread function, called a smearing function, being greater than zero only for a limited number of grid points of said sample and producing a 3D structure whose projections convoluted with the point spread function will adapt to the observed structure.

17. An apparatus according to claim 16, wherein the input means comprises a device (10; 52) supplying observed data of 2D projections in digitized form of the observed sample and forwarding the data to the calculation means in order to provide a high fidelity 3D image reconstruction, characterized in that said calculation means processes the data with the use of an approximation that said projected point spread function is greater than zero only for a limited number of grid points in a layer perpendicular to the beam direction and producing the 3D structure whose projections convoluted with the point spread function will adapt to the observed structure.

18. An apparatus according to claim 14, characterized in that said input means is a microscope, for instance an electron microscope, a light microscope, or a confocal microscope.

19. An apparatus according to claim 14, characterized in that said input means is a card reader (52) reading a pattern of sample elements (51) having slightly different designs provided on a card (50) in order to provide a pattern reconstruction for providing a secure and unique identity of the card.

20. An apparatus according to claim 14 for a 2D reconstruction, characterized in that said input means is a scanning device (40) scanning a 2D image; and that said projections are lines across the sample.

21. An apparatus according to claim 14, characterized in that the input means (52, 13, 14) records variation of the quantity in relation to a predetermined variable and the calculation means reconstructs the measured quantity as a series of measurement data.

22. An apparatus according to claim 14, characterized in that the estimated and the predjudice distribution means are working on an outcut envelope from an object to be observed, the envelope being the sample to be reconstructed; and that the estimated and the predjudice distribution means regard the rest of the object as a buffer to be reproduced from iteration to iteration without reconstruction.

* * * * *